US009797148B2

(12) United States Patent
Kodi

(10) Patent No.: US 9,797,148 B2
(45) Date of Patent: Oct. 24, 2017

(54) CLIP APPLYING APPARATUS

(71) Applicant: Jon R. Kodi, Lebanon, TN (US)

(72) Inventor: Jon R. Kodi, Lebanon, TN (US)

(73) Assignee: Kodi Klip, LLC, Lebanon, TN (US)

( * ) Notice: Subject to any disclaimer, the term of this patent is extended or adjusted under 35 U.S.C. 154(b) by 198 days.

(21) Appl. No.: 14/478,723

(22) Filed: Sep. 5, 2014

(65) Prior Publication Data

US 2016/0069096 A1 Mar. 10, 2016

(51) Int. Cl.

| | |
|---|---|
| ***B23P 11/00*** | (2006.01) |
| ***E04G 21/12*** | (2006.01) |
| ***B21F 15/06*** | (2006.01) |
| ***E04C 5/16*** | (2006.01) |
| ***B25B 31/00*** | (2006.01) |
| ***B21F 27/12*** | (2006.01) |

(52) U.S. Cl.

CPC ............ *E04G 21/122* (2013.01); *B21F 15/06* (2013.01); *B21F 27/121* (2013.01); *B25B 31/00* (2013.01); *E04C 5/163* (2013.01); *E04C 5/167* (2013.01)

(58) Field of Classification Search

USPC ........................................... 29/243.5, 243.56

See application file for complete search history.

(56) References Cited

U.S. PATENT DOCUMENTS

| | | | | |
|---|---|---|---|---|
| 721,434 | A | | 2/1903 | Edeburn |
| 1,451,717 | A | | 4/1923 | Sommer |
| 1,547,499 | A | * | 7/1925 | Kodi ...................... B60Q 1/124 362/49 |
| 1,852,673 | A | | 4/1932 | Pilj |
| 1,986,528 | A | | 1/1935 | Ranger |
| 2,551,826 | A | | 5/1951 | Cox, Sr. |
| 2,571,337 | A | | 10/1951 | Burnham |
| 2,879,087 | A | | 3/1959 | Haglund |

(Continued)

FOREIGN PATENT DOCUMENTS

| | | | | | |
|---|---|---|---|---|---|
| CA | 2538868 | A1 | * | 11/2006 | ............ E04C 5/163 |
| JP | 04108944 | A | | 4/1992 | |

(Continued)

OTHER PUBLICATIONS

Jiffy Clip Long Gun Applicator by Jiffy Clip, Inc. (see www.jiffyclip.com)(undated but admitted to be prior art).

(Continued)

*Primary Examiner* — Larry E Waggle, Jr.
*Assistant Examiner* — Alvin Grant
(74) *Attorney, Agent, or Firm* — Lucian Wayne Beavers; Patterson Intellectual Property Law, PC

(57) ABSTRACT

A clip applying apparatus is provided for connecting plastic clips to reinforcing bars. The clip applying apparatus will generally include a barrel, a hammer received in the barrel, and a main drive configured to reciprocate the hammer within the barrel. Other features may include a safety shield as well as a lockout lever which prevents proximal movement of the safety shield if a clip is not fully received within the barrel. Another feature which may be included is a clip door operably connected to a sliding-pivot channel defined in one of the barrel and the clip door. Still other features may include at least one guide slot disposed within the barrel to direct hammer movement, and a hammer bushing coaxial with the barrel to support the hammer.

20 Claims, 10 Drawing Sheets

(56) References Cited

U.S. PATENT DOCUMENTS

| | | | | |
|---|---|---|---|---|
| 3,006,115 | A | 10/1961 | Hillberg | |
| 3,216,752 | A | 11/1965 | Rifken | |
| 3,360,883 | A | 1/1968 | Glanzer | |
| 3,461,536 | A | 8/1969 | Skold | |
| 3,516,574 | A * | 6/1970 | Herbert | B25C 1/001 221/278 |
| 3,694,988 | A | 10/1972 | Skold | |
| 3,788,025 | A | 1/1974 | Holmes | |
| 3,945,238 | A | 3/1976 | Eckert | |
| 4,060,954 | A | 12/1977 | Liuzza | |
| 4,080,770 | A | 3/1978 | Vigh | |
| 4,110,951 | A | 9/1978 | Padrun | |
| 4,136,984 | A | 1/1979 | Hayashi | |
| 4,136,985 | A | 1/1979 | Taul | |
| 4,214,841 | A | 7/1980 | Hayashi | |
| 4,388,791 | A | 6/1983 | Anderson | |
| 4,440,519 | A | 4/1984 | Pennel et al. | |
| 4,482,088 | A | 11/1984 | Hyun | |
| 4,511,073 | A | 4/1985 | Furutsu | |
| 4,610,122 | A | 9/1986 | De Clercq | |
| 4,617,775 | A | 10/1986 | Padrun | |
| 4,800,702 | A | 1/1989 | Wheeler | |
| 4,807,345 | A | 2/1989 | Jacobson | |
| 4,835,933 | A | 6/1989 | Yung | |
| 4,858,811 | A * | 8/1989 | Brosius | B25C 1/143 227/10 |
| 4,991,372 | A | 2/1991 | Sonneville | |
| 5,020,355 | A | 6/1991 | Payne et al. | |
| 5,207,692 | A * | 5/1993 | Kraus | A61B 17/083 227/901 |
| 5,269,054 | A | 12/1993 | Poteat et al. | |
| 5,370,293 | A | 12/1994 | Bevins | |
| 5,371,991 | A * | 12/1994 | Bechtel | E04C 5/167 24/336 |
| D355,582 | S | 2/1995 | Sleight | |
| 5,518,399 | A | 5/1996 | Sicurelli, Jr. et al. | |
| 5,519,955 | A * | 5/1996 | Peifer | F41A 19/39 42/51 |
| 5,588,554 | A | 12/1996 | Jones | |
| 5,595,039 | A | 1/1997 | Lowery | |
| 5,626,436 | A | 5/1997 | Dragone | |
| 5,651,169 | A | 7/1997 | Ohuchi et al. | |
| 5,683,025 | A | 11/1997 | Grendol | |
| 5,697,591 | A | 12/1997 | Cooper | |
| 5,752,297 | A | 5/1998 | Ramey | |
| 5,826,629 | A | 10/1998 | West | |
| 5,881,452 | A * | 3/1999 | Nowell, III | B25B 27/146 29/243.56 |
| 5,893,252 | A | 4/1999 | Hardy et al. | |
| 5,938,099 | A * | 8/1999 | Ciccarelli | B21F 15/06 227/120 |
| 6,006,975 | A * | 12/1999 | Ishizawa | B25C 1/047 227/119 |
| 6,067,707 | A * | 5/2000 | Cluggish | B25B 27/146 29/243.56 |
| 6,148,488 | A | 11/2000 | Gristock | |
| 6,276,108 | B1 * | 8/2001 | Padrun | E04C 5/167 52/677 |
| 6,298,549 | B1 * | 10/2001 | Mangone, Jr. | E04C 5/162 24/543 |
| 6,354,054 | B1 | 3/2002 | Verelli et al. | |
| 6,371,763 | B1 | 4/2002 | Sicurelli, Jr. et al. | |
| 6,422,447 | B1 * | 7/2002 | White | B25C 1/003 227/120 |
| 6,513,555 | B1 | 2/2003 | Lesser et al. | |
| 6,585,142 | B1 | 7/2003 | Chen | |
| 6,672,498 | B2 * | 1/2004 | White | B25C 1/003 227/120 |
| 6,725,535 | B2 | 4/2004 | Edson et al. | |
| 6,785,950 | B1 * | 9/2004 | Scirbona | B25D 11/102 173/203 |
| 6,857,246 | B2 | 2/2005 | Erbetta et al. | |
| 6,915,624 | B2 | 7/2005 | Shibazaki et al. | |
| 6,925,698 | B2 | 8/2005 | Goodsmith et al. | |
| 6,971,515 | B2 * | 12/2005 | Cooper | B65C 7/005 206/343 |
| 7,003,860 | B2 | 2/2006 | Bloch et al. | |
| D529,794 | S | 10/2006 | Murray | |
| 7,147,209 | B2 | 12/2006 | Jones et al. | |
| 7,152,831 | B2 * | 12/2006 | Riedy | F16L 3/223 248/68.1 |
| D534,418 | S | 1/2007 | Minor et al. | |
| 7,210,219 | B2 * | 5/2007 | Thal | B23P 19/084 29/229 |
| D587,564 | S | 3/2009 | Kodi | |
| 7,559,532 | B1 | 7/2009 | Kodi | |
| 7,587,872 | B2 | 9/2009 | Kodi | |
| 7,891,074 | B2 | 2/2011 | Kodi | |
| 7,900,419 | B2 | 3/2011 | Kodi | |
| 7,908,723 | B1 * | 3/2011 | Kodi | B25B 31/00 29/243.53 |
| 7,963,392 | B2 | 6/2011 | Kodi | |
| 8,117,796 | B2 | 2/2012 | Kodi | |
| 8,322,006 | B1 * | 12/2012 | Kodi | B25C 1/008 29/243.526 |
| 8,640,323 | B2 | 2/2014 | Kodi | |
| 8,661,639 | B2 * | 3/2014 | Bondielli | E04F 21/0092 29/243.5 |
| 8,678,261 | B2 * | 3/2014 | Lee | B25C 1/184 227/119 |
| 8,776,328 | B2 * | 7/2014 | Kodi | E04C 5/163 24/339 |
| 2002/0158095 | A1 * | 10/2002 | Vor Keller | E05B 47/0603 224/244 |
| 2003/0154579 | A1 | 8/2003 | Disher | |
| 2004/0040247 | A1 | 3/2004 | Morse | |
| 2004/0154261 | A1 | 8/2004 | Miller | |
| 2004/0261352 | A1 | 12/2004 | Bennett et al. | |
| 2005/0217198 | A1 * | 10/2005 | Carraher | E04C 5/163 52/719 |
| 2006/0248844 | A1 | 11/2006 | Kodi | |
| 2007/0284385 | A1 | 12/2007 | Carraher et al. | |
| 2008/0115448 | A1 * | 5/2008 | Kodi | E04C 5/167 52/719 |
| 2008/0115449 | A1 * | 5/2008 | Kodi | E04C 5/167 52/719 |
| 2008/0118304 | A1 | 5/2008 | Carraher et al. | |

FOREIGN PATENT DOCUMENTS

| | | | | |
|---|---|---|---|---|
| JP | 07-019221 | U | 4/1995 | |
| JP | 11-311820 | A | 11/1999 | |
| JP | EP 1070808 | A1 * | 1/2001 | B65B 13/285 |
| JP | 2008-260094 | A | 10/2008 | |
| WO | WO 9630607 | A1 * | 10/1996 | E04C 5/167 |
| WO | WO 2006031407 | A2 * | 3/2006 | B25H 3/04 |
| WO | WO 2008064307 | A2 * | 5/2008 | E04C 5/167 |

OTHER PUBLICATIONS

International Search Report in corresponding International Application No. PCT/US2015/048457, dated Nov. 9, 2015, 3 pp. (not prior art).

English translation of Japanese Notice of Rejection in corresponding Japanese Patent Application No. 2014-195469, issue date Nov. 10, 2015, 6 pp. (not prior art).

PCT International Preliminary Report on Patentability and Written Opinion of the International Searching Authority in International Application No. PCT/US2015/048457, dated Mar. 16, 2017, 8 pp. (not prior art).

* cited by examiner

CLIP APPLYING APPARATUS

BACKGROUND OF THE INVENTION

1. Field of the Invention

The present invention relates to an apparatus for attaching clips to connect bars, when the bars are used to reinforce concrete. The present invention is particularly applicable for use with bar clips such as those set forth in U.S. Patent Application Publication No. 2006/0248844 to Kodi, which is assigned to the assignee of the present invention, the details of which are incorporated herein by reference.

2. Description of the Prior Art

Supporting bars are commonly used to reinforce concrete. The supporting bars are laid out in a grid where the cement is to be poured, to maximize the effectiveness of the supporting bars; they are placed at specific heights, usually between about 2 and 6 inches from the ground. Bars are then connected so the grid is stable and will not move when the cement or concrete is poured. Many methods have been used to connect bars, and many are done by hand. Rebar is the type of supporting bar most commonly used. When the rebar is connected by hand, it requires a laborer to bend over and connects the rebar at many points within the grid. This is labor intensive, slow, and tends to cause injuries from the repeated bending. In some instances, the rebar grid can be prepared first, and then placed into a form where the cement or concrete is to be poured. This can reduce the bending required, but does not address the time and labor required to connect the rebar. To reduce the time needed to connect the rebar and to minimize the time a laborer is working in a stooped position, several applicators for connecting rebar have been developed.

Three examples of such clip applicators are shown in U.S. Pat. No. 7,891,074 to Kodi entitled "Bar Connecting Apparatus," in U.S. Pat. No. 7,963,392 to Kodi entitled "Bar Connecting Apparatus," and U.S. Pat. No. 8,322,006 to Kodi entitled "Clip Gun With Pneumatic Feed," all of which are assigned to the assignee of the present invention, and are incorporated herein by reference.

There is a continuing need in the art for further improvements in such clip applying apparatus.

BRIEF SUMMARY OF THE INVENTION

In one aspect of the invention an apparatus for applying a clip to a first reinforcing bar and a second reinforcing bar is provided. The apparatus includes a barrel having a clip receiving cavity and an alignment head defined at the barrel's distal end. The apparatus may also include a hammer received in the barrel. A main drive connected to the hammer and configured to reciprocate the hammer within the barrel will be included. A clip track is connected to the barrel and aligned with the cavity for guiding a string of frangibly connected clips into the cavity. A safety shield may be connected to the barrel and include a forward portion extending beyond the alignment head. A lockout lever may be pivotally connected to the barrel to pivot outward when a clip is not fully received within the clip receiving cavity. When the lockout lever is pivoted outward, proximal motion of the safety shield will be prevented.

In another aspect of the invention, the apparatus includes a barrel having a clip receiving cavity and an alignment head defined at the distal end of the barrel. A hammer may be received in the barrel. A main drive may also be connected to the hammer and configured to reciprocate the hammer within the barrel. A clip door may be provided to cover the clip receiving cavity. A sliding-pivot channel defined in either the barrel or the clip door may be included for guiding the motion of the clip door as it opens and closes. The sliding-pivot channel may include a channel length and a channel width wherein the channel width is smaller than the channel length. A pivot pin is attached to the other of the barrel or the clip door and received within the sliding-pivot channel.

In yet another aspect of the invention, a clip applying apparatus is provided for applying a clip to a first reinforcing bar and a second reinforcing bar. The apparatus includes a barrel having at least one guide slot disposed within the barrel. A hammer having a shaft portion may be received within the barrel. In some embodiments, a projection is attached to the hammer and received within the at least one guide slot. The apparatus may also include a hammer bushing coaxial with the barrel and attached at the barrel's proximal end. The hammer bushing may receive and support a shaft of the hammer during operation.

In some aspects of the invention, the lockout lever may include a lobe member having an inner face directed toward the barrel and configured to engage a string of frangibly connected clips and thereby force the lever outward away from the barrel when a clip is not fully received within the clip receiving cavity. This outward position may substantially prevent any proximal movement of the safety shield. The lobe member may also include a support face to support the clip string when the lockout lever is pivoted inward and a clip is fully received within the clip receiving cavity. The support face may prevent regressive movement of the clip string. For example, the string will be unable to fall out of the clip receiving cavity once a clip is fully received in the clip receiving cavity. The support face will serve to hold the clip in place before it is fired from the apparatus or slid upward out of the clip receiving cavity. The inward position of the lockout lever may also allow the safety shield to move forward and rearward in a distal or proximal direction, respectively.

Some aspects of the invention may include an anti-backup lever pivotally connected to the barrel. The anti-backup lever may include a tooth extending toward the clip track. The tooth may be configured to engage the string of frangibly connected clips to hold the string in place and prevent regressive movement of the clip string.

Numerous objects features and advantages of the present invention will be readily apparent to those skilled in the art upon a reading of the following disclosure when taken in conjunction with the accompanying drawings.

DETAILED DESCRIPTION OF THE INVENTION

In order to facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified. The term "when" is used to specify orientation for relative positions of components, not as a temporal limitation of the claims or apparatus described and claimed herein unless otherwise specified. The term "lateral" denotes a side to side direction when facing the "front" of an object.

Figure 1:
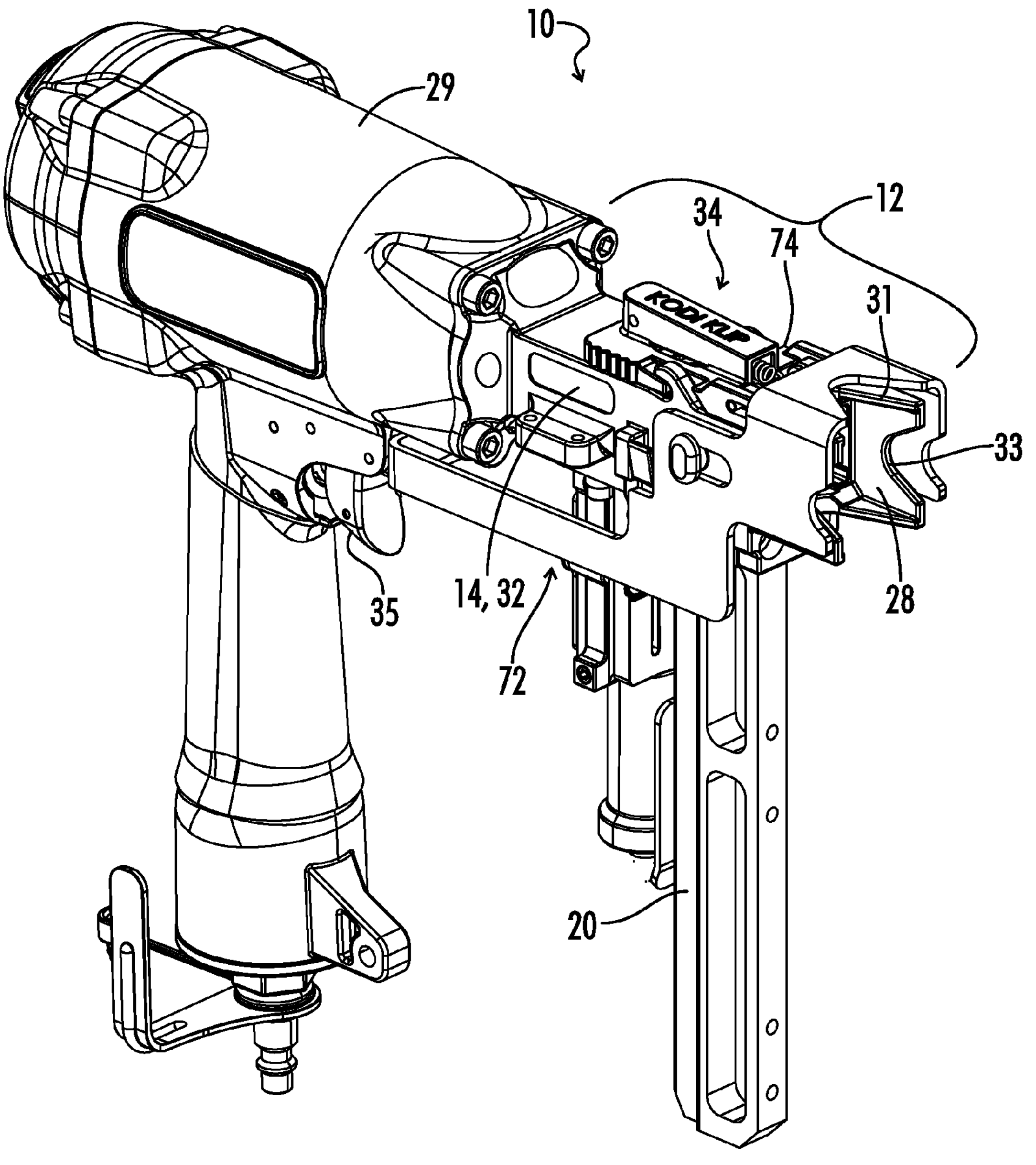
FIG. 1 is a perspective view of a clip applying apparatus.
Figure 4:
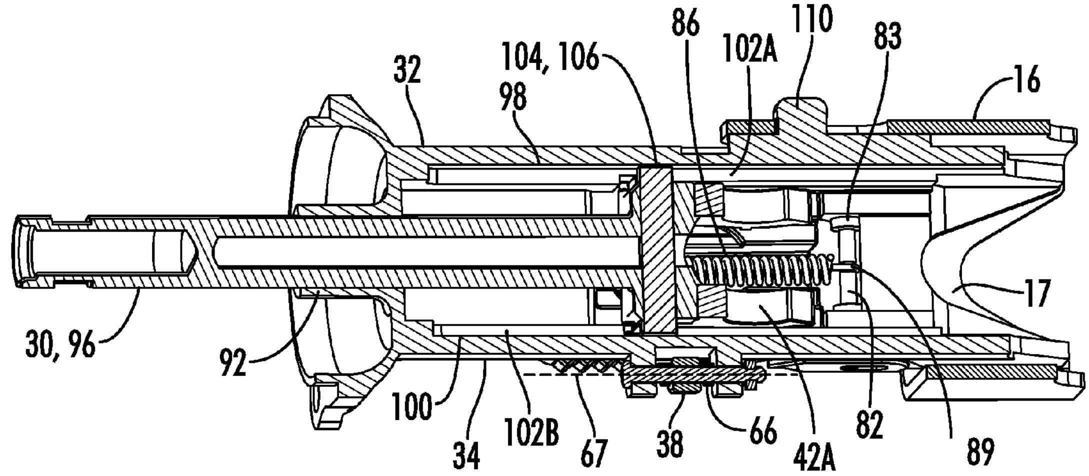
FIG. 4 is a bottom section view taken along line 4-4 of FIG. 2.
Figure 5:
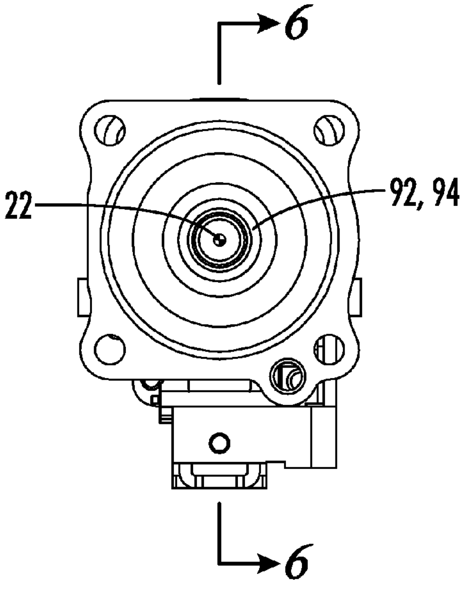
FIG. 5 is a rear view of the front assembly of FIG. 2.
Figure 8:
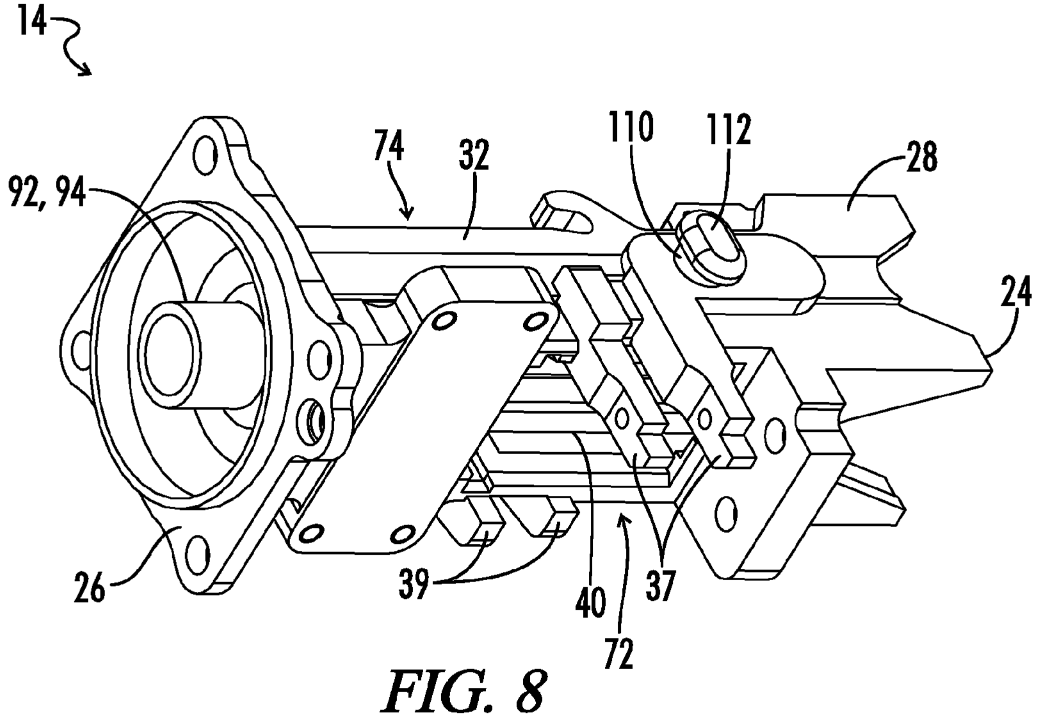
FIG. 8 is a perspective view of the barrel according to an embodiment of the present invention.

FIG. 1 shows an embodiment of a clip applying apparatus 10 which includes a front assembly 12. The front assembly 12 includes a barrel 14, a safety shield 16, a clip door 18, a clip track 20, and a longitudinal axis 22 which is central to the barrel (illustrated in FIG. 5). The barrel includes a distal end 24 and a proximal end 26, as well as four sides. As shown in FIGS. 1, 4, and 8, the barrel 14 has a first side 32, a second side 34, a receiving side 72, and an exit side 74. The first side 32 and second side 34 are respectively disposed on the right and left sides of the barrel 14. The receiving side 72 and exit side 74 respectively form the bottom and top of the barrel 14. A clip receiving cavity 40 is disposed within the barrel 14 and between the four sides 32, 34, 72, 74.

Figure 15:
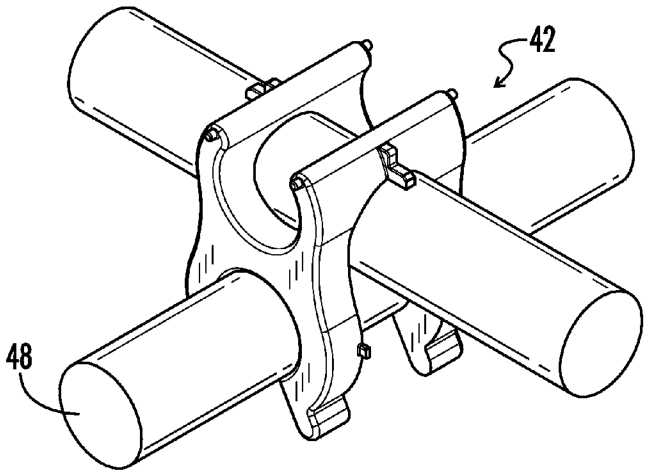
FIG. 15 illustrates one of the clips in place upon two transverse reinforcing bars.

An alignment head 28 is disposed at the distal end 24, and includes first pair of notches 31 and second pairs of notches 33 for positioning the barrel 14 against the first and second reinforcing bars 46 and 48 when the bars 46, 48 are oriented transversely to each other as shown in FIG. 15.

In some embodiments, the barrel 14 may be formed as a single integral unit, as shown in FIG. 8. Distal end 24 and proximal end 26 may be integrally-joined, while alignment head 28 may be defined at the distal end 24. Alternatively, the barrel 14 may be formed from separately attachable members.

A main drive 29 connects to a hammer 30 and is configured to reciprocate the hammer 30 within the barrel 14. In some embodiments, the main drive 29 is pneumatically powered.

Figure 14:
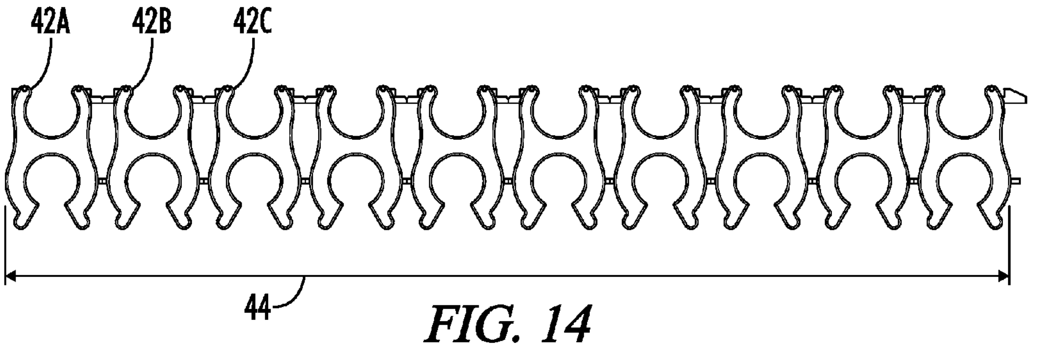
FIG. 14 is a side view of a string of frangibly connected clips.
Figure 16:
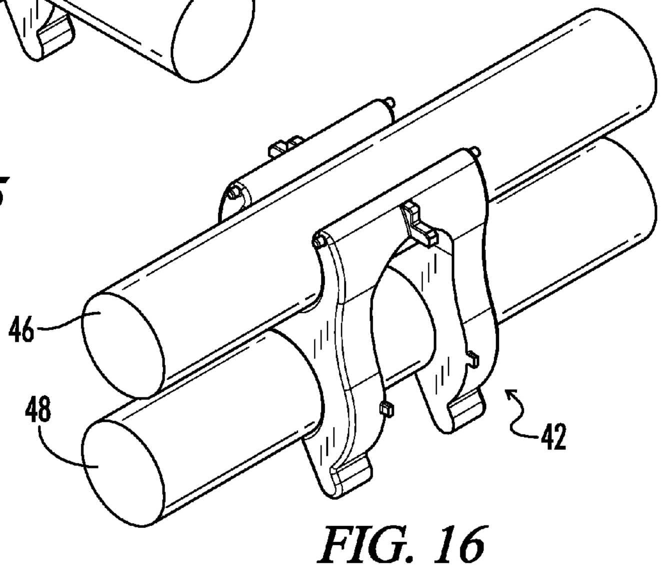
FIG. 16 illustrates one of the clips in place upon two parallel reinforcing bars.

FIG. 14 provides an example of a string 44 of frangibly connected clips. Each string 44 of frangibly connected clips will comprise several individual clips 42A, 42B, 42C. As shown in FIGS. 15 and 16, individual clips 42 may be used to attach a first reinforcing bar 46, and a second reinforcing bar 48.

In order to attach the clips 42, the first notch pair 31 and second notch pair 33 may receive one or both of the first and second reinforcing bars 46, 48 to reach proper alignment of the apparatus 10 to the reinforcing bars 46, 48. Upon proper alignment, an individual clip 42 may be fired from the barrel 14 and onto the reinforcing bars 46, 48.

Some embodiments include a trigger assembly 35, as shown in FIG. 1. The trigger assembly 35 is connected to the main drive 29 to actuate reciprocation of the hammer 30.

The trigger assembly 35 includes a safety release operably associated with the safety shield 16. The safety shield 16 is connected to the barrel 14 and includes a forward portion 17 extending distally beyond the alignment head 28. As the safety shield 16 is moved in a rearward, proximal direction relative to the barrel 14, the safety release will permit actuation of the trigger assembly 35 and activation of the main drive 29.

Figure 3:
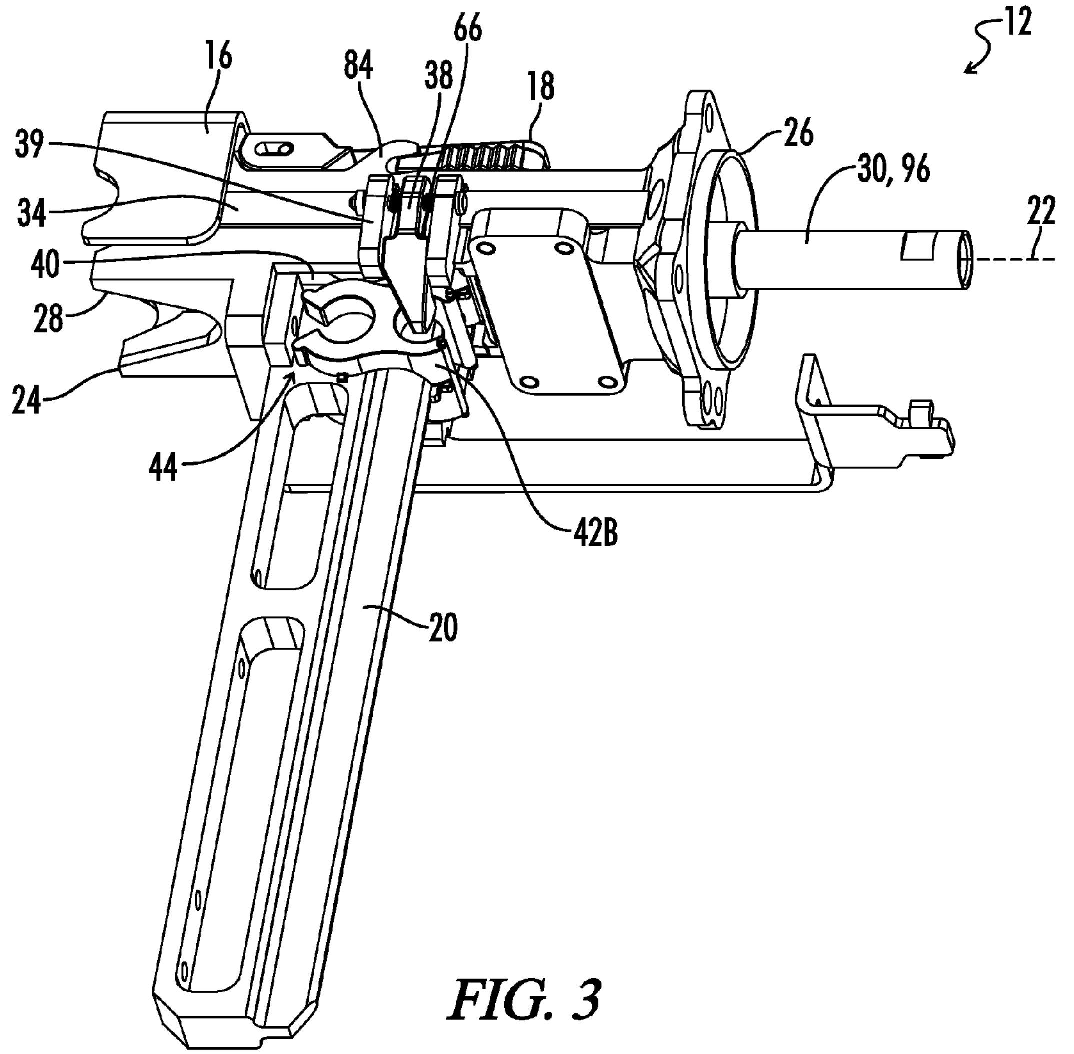
FIG. 3 is a left perspective view of the front assembly of FIG. 2.
Figure 6:
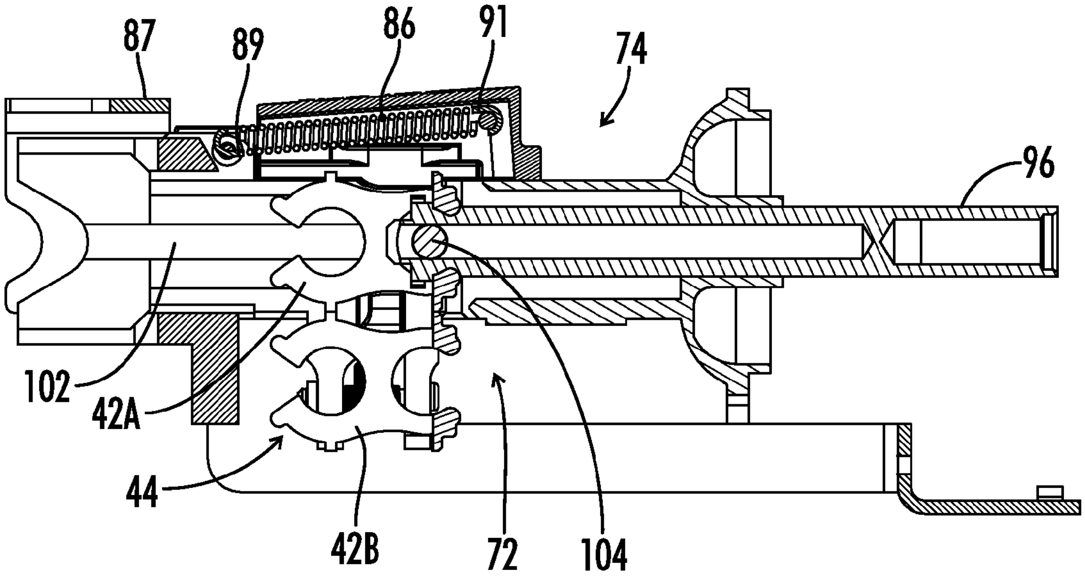
FIG. 6 is an elevation section view of the front assembly taken along line 6-6 of FIG. 5.

FIGS. 3 and 6 illustrate a possible orientation of clips 42 during operation. During operation, a string 44 of frangibly connected clips, will be disposed on the clip track 20 such that one clip 42A is fully received within the clip receiving cavity 40. When the trigger assembly 35 is actuated, the main drive 29 will be activated to reciprocate the hammer 30. Upon activation of the hammer, the hammer will engage one clip 42A to fire it from the barrel 14 (i.e., force the clip 42A along the longitudinal axis 22 and out of the barrel 14 at the distal end 24). Following the firing of one clip 42A, the string 44 of frangibly connected clips will be advanced vertically along the clip track 20 until a second clip 42B is fully received within the clip receiving cavity 40.

Figure 2:
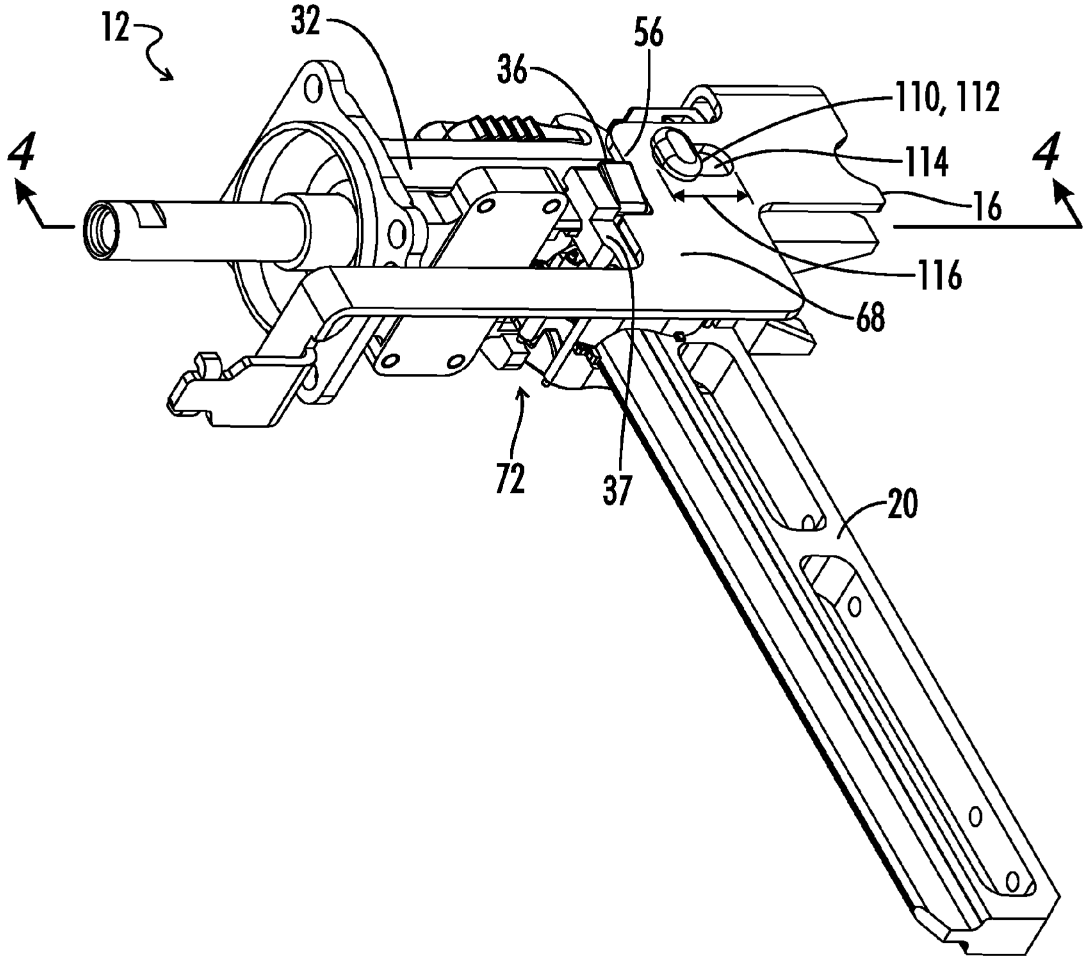
FIG. 2 is a right side perspective view of a front assembly according to an embodiment of the present invention.
Figure 13A:
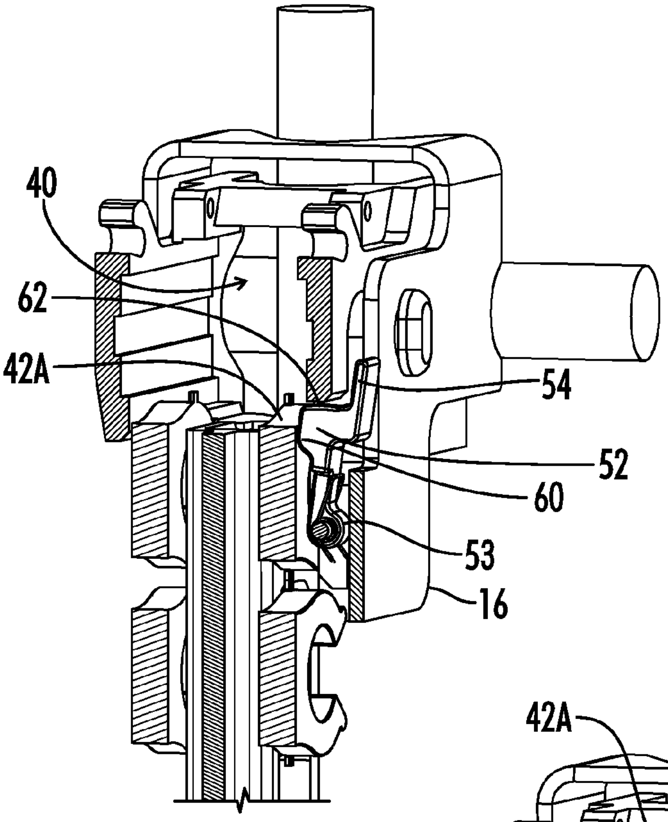
FIG. 13A is a perspective rear view of an embodiment of the clip receiving cavity and the safety shield, wherein a clip is not fully received within the clip receiving cavity. The lockout lever is shown in a first position.
Figure 13B:
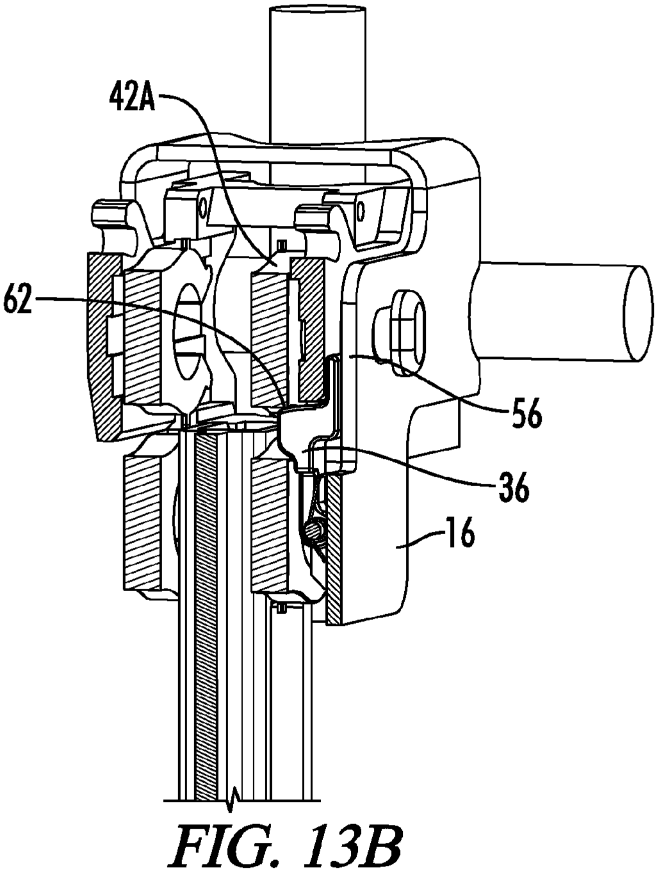
FIG. 13B is a perspective rear view of an embodiment of the clip receiving cavity and the safety shield, wherein a clip is fully received within the clip receiving cavity. The lockout lever is shown in a second position.

As shown in FIGS. 2, 13A, and 13B, some embodiments also include a lockout lever to restrict movement of the safety shield 16 during certain operational conditions.

FIG. 2 illustrates a perspective view of first side 32 of the front assembly 12. Pivotally attached to first side 32 is a lockout lever 36. As will be described below, the lockout lever 36 is configured to have a first and a second position. The first position is provided to prevent the safety shield 16 from moving in a proximal direction, while the second position permits forward and backward motion of the safety shield 16 in the distal and proximal directions.

The lockout lever 36 is supported on opposite sides by integral wing members 37, shown also in FIG. 8. The wing members 37 provide support for the pivot pin and lateral protection to the lockout lever 36. If the apparatus is mishandled or accidentally slips from a user's grasp, the lockout lever should not bear the full force of the impact. Instead, integral wing members 37 should be impacted first, if at all.

FIGS. 13A and 13B, illustrate operation of the lockout lever 36 in a first position, FIG. 13A, and a second position, FIG. 13B. When a clip 42A is fully engaged in the clip receiving cavity 40, the lockout lever 36 will be biased toward the clip receiving cavity 40. Movement of the clip 42A into the clip receiving cavity 40 will force the lockout lever 36 outward, as shown in FIG. 13A, such that proximal movement of the safety shield 16 is prevented until the clip 42A is fully received in the cavity 40, as shown in FIG. 13B.

Figure 11:
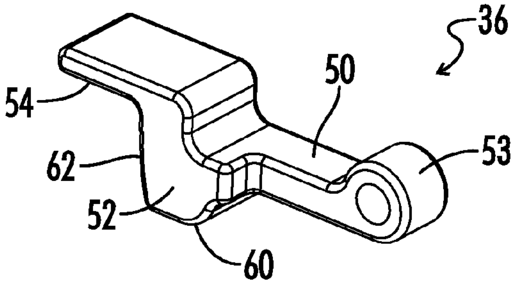
FIG. 11 is a perspective view of a lockout lever according to one embodiment of the present invention.

As shown in FIGS. 11, 13A and 13B, the lockout lever 36 includes a lever body 50, a lobe member 52 extending laterally from the body 50, a stop member 54 extending longitudinally from the body 50, and a pivot joint 53 disposed within the body 50.

Lobe member 52 extends laterally from the lever body 50 toward the clip receiving cavity 40. In the second position, an inner face 60 of the lobe member 52 faces the barrel second side 34 while a support face 62 faces the clip receiving cavity 40. When a clip 42A is fully engaged in the clip receiving cavity 40 the lobe member 52 will engage the clip 42A at the support face 62 and thereby prevent regressive movement. In contrast, when the clip 42A is not fully engaged in the clip receiving cavity 40, the clip 42A will serve to push against the inner face 60 and simultaneously actuate the stop member 54 in an outward direction (i.e., first position). If a user attempts to press the safety shield 16 against a reinforcing bar 46, 48—or otherwise move the safety shield 16 in a proximal direction—while the lockout lever 36 is in a first position, the stop member 54 will engage the proximally-facing safety shield edge wall 56. When the edge wall 56 is engaged with the stop member 54, actuation of the trigger assembly 35 will be prevented. In some embodiments, a pivot spring 58 will serve to bias the lockout lever 36 toward the clip receiving cavity 40.

During operation, the pivot joint 53 is substantially covered by a wall 68 of the safety shield 16. As a result, the pivot joint 53 will be substantially protected from interference from debris or accidental engagement.

FIG. 3 provides a side view of the front assembly 12 of one embodiment. As illustrated, an anti-backup lever 38 configured to engage a clip 42B is attached to the second side 34 in some embodiments. As will be described below, the anti-backup lever 38 will prevent regressive movement of the string 44 of frangibly connected clips during operation.

The anti-backup lever 38 attaches to the barrel 14 at secondary wing members 39. The anti-backup lever 38 is positioned between the secondary wing members 39 such that the secondary wing members 39 provide some degree of lateral coverage and protection. If the apparatus is mishandled or accidentally slips from a user's grasp, the anti-backup lever 38 should not bear the full force of the impact. Instead, secondary wing members 39 should be impacted first, if at all.

As shown in FIGS. 3, 4, and 6, the anti-backup lever 38 may be pivotally connected to the second side 34. When clip 42A is received within the clip receiving cavity 40, the anti-backup lever 38 engages a second clip 42B with tooth 64 (seen in FIG. 10). Clip 42B is adjacent to clip 42A. This engagement serves to prevent regressive movement of the string 44 of frangibly connected clips even in instances where a user attempts to improperly withdraw the string 44 from the clip track 20. Furthermore, because the string 44 is supported on opposite sides, a clip 42A disposed in the clip receiving cavity 40 will not become misaligned if the string 44 is improperly withdrawn from the clip track 20.

Figure 10:
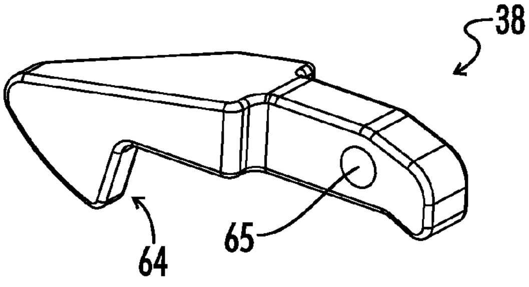
FIG. 10 is a perspective view of an anti-backup lever according to one embodiment of the present invention.

FIGS. 4 and 10 illustrate an embodiment of the anti-backup lever in greater detail. The anti-backup lever 38 also includes a lever joint 65 defined within the anti-backup lever 38, and a lever pivot axis 67 about which the anti-backup lever 38 rotates. Some embodiments also include a retention spring 66 for biasing the anti-backup lever 38 toward the clip track 20. As shown in FIG. 4, in some embodiments, the retention spring 66 is a torsion spring coaxial with the lever pivot axis 67.

Figure 12A:
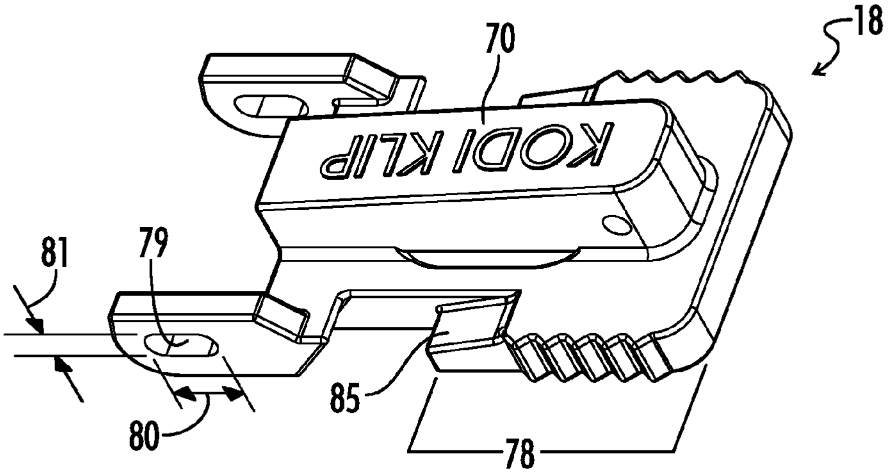
FIG. 12A is a perspective view of a clip door as well as according to one embodiment of this invention
Figure 12B:
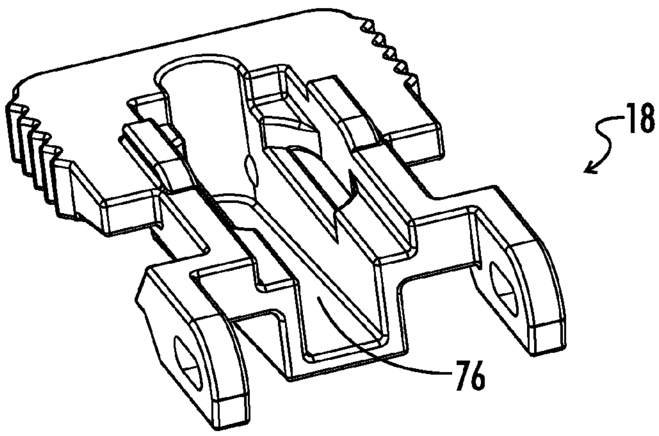
FIG. 12B is a perspective bottom view of the clip door embodiment of FIG. 12A.

Returning to FIGS. 1 and 6, some embodiments include a clip door 18 connected to the barrel 14 at the exit side 74. The clip door 18 is aligned with the clip receiving cavity 40 to provide a means for selectively covering and uncovering one end of the clip receiving cavity. When closed, the clip door 18 prevents removal of the string 44, as described below. As shown in FIGS. 12A and 12B, the clip door 18 may include a door body 70, a recess 76 defined in the door body 70, and a grip member 78 extending laterally from the door body 70.

A described above, a string 44 of frangibly connected clips is configured to enter the receiving cavity 40 at the barrel receiving side 72. If a user wishes to remove the string 44 of frangibly connected clips without discharging a clip 42 from the alignment head 28, the user may push the string 44 vertically along the clip receiving track 20, through the clip receiving cavity 40, and out the barrel exit side 74. It is noted that this removal process will only be possible when the clip door 18 is in the open position. When the clip door 18 is in the closed position, the clip receiving cavity 40 will be covered, and removal will be prevented.

Figure 7A:
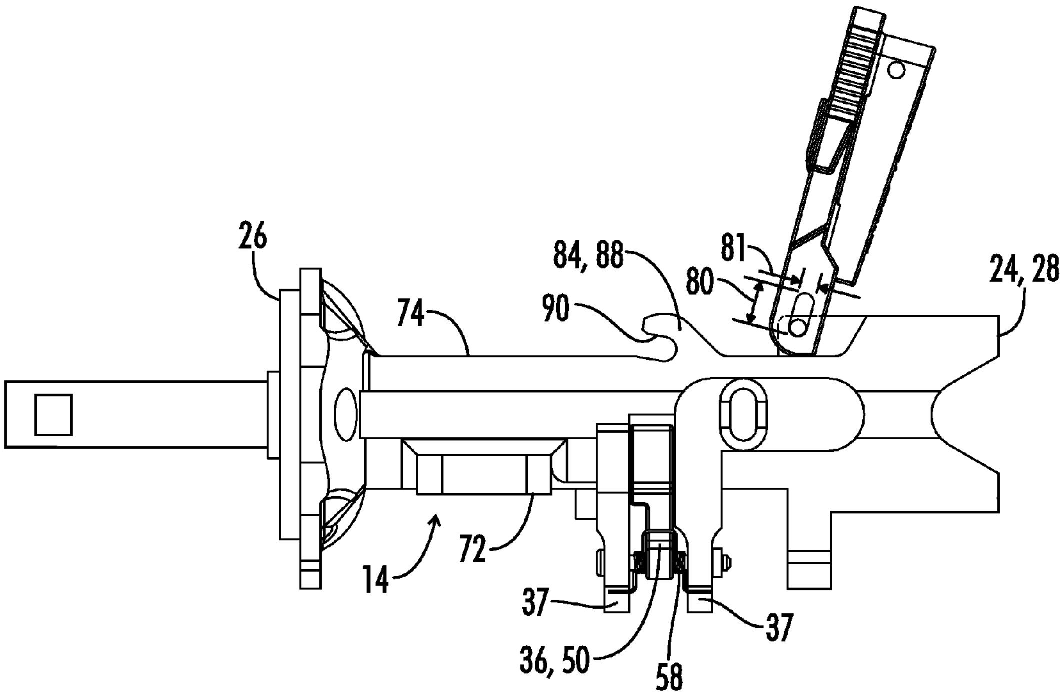
FIG. 7A is a side view of the clip door in an open position.
Figure 7B:
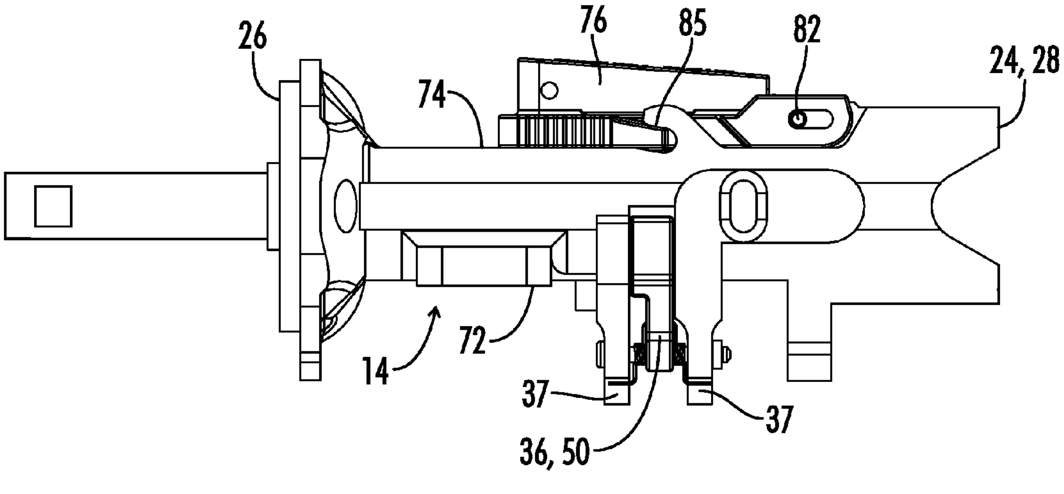
FIG. 7B is a side view of the clip door in a closed position.

In the embodiment of FIGS. 12A and 12B, the clip door 18 also includes a sliding-pivot channel 79 defined in the clip door body 70. Sliding-pivot channel 79 includes a channel length 80 and a channel width 81. As illustrated in FIGS. 7A, 7B, and 12, the channel width 81 is smaller than the channel length 80. A pivot pin 82 is attached to barrel 14 and is received in the sliding-pivot channel 79.

In alternative embodiments, the sliding-pivot channel may be defined in the barrel 14, and the pivot pin may be attached to the door 18.

A door stop tab 84 is fixed to the barrel exit side 74. As described below, the tab 84 is configured to engage grip member 78 when the clip door 18 is in a closed position. As shown in FIGS. 12A and 12B, the grip member 78 of some embodiments includes a sloped face 85 which is tapered in relation to the clip door body 70. The sloped face 85 narrows as it extends towards the sliding-pivot channel 79.

Optionally, the sloped face 85 may have no taper, and instead, maintain a constant profile in relation to the clip door body 70.

As shown in FIG. 4, biasing spring 86 is attached to the clip door parallel to the length of the sliding-pivot channel 79. The biasing spring 86 is configured to bias the clip door 18 towards the door stop tab 84 when the clip door is in a closed position of FIG. 7B.

FIGS. 7A and 7B show an embodiment of the clip door 18 in an open position and a closed position, respectively. Door stop tab 84 may include a hook 88 integrally attached to the barrel 14. The hook 88 includes a concave inner face 90 which is configured to engage the sloped face 85 when the clip door 18 is in the closed position. Moving the clip door 18 from the closed position to an open position requires sliding the clip door 18 along the length of the sliding-pivot channel 79 until the grip member 78 is no longer directly beneath the concave inner face 90. Upon passing the concave inner face 90, the clip door 18 may be pivoted along pivot pin 82 and into a position whereby the clip door 18 is substantially upright or at an obtuse angle in relation to the barrel 14, as shown in FIG. 7A.

In order to ensure the biasing spring 86 does not interfere with the movement of clips 42 within the clip receiving cavity 40, the biasing spring 86 may be received within the recess 76. Disposing the biasing spring 86 in the recess 76, ensures the spring 86 does not enter the clip receiving cavity 40. As a result, a clip 42 may travel through the barrel 14 without touching or engaging the biasing spring 86. Furthermore, positioning the biasing spring 86 within the recess 76 ensures the biasing spring 86 is tensioned primarily in a linear direction. The primarily linear tension provides an even distribution of force across the spring 86.

As shown in FIGS. 4, 7A, and 7B, the pivot pin 82 passes through pivot pin support 83 to maintain the pivot pin 82 in a constant position relative to the barrel 14. The biasing spring 86 may be connected directly to the pivot pin 82, thus maintaining linear tension on the biasing spring 86, regardless of the clip door 18 position.

FIG. 6 illustrates one embodiment wherein a distal spring end 89 is attached to the barrel exit side 74, and a proximal spring end 91 is attached at the clip door 18.

Furthermore, in some embodiments, safety shield 16 includes a top wall 87 disposed over the barrel exit side 74. When the clip door 18 is in the closed position, the clip door 18 will be positioned beneath the top wall 87 to allow for rearward or proximal movement of the safety shield 16. Conversely, if the clip door 18 is in the open position, the clip door 18 will be positioned at least partially above the top wall 87. Any attempt to move the safety shield 16 rearward in a proximal direction will force the top wall 87 to engage with the clip door 18 and prevent further proximal movement. As described above, if the safety shield 16 is not in a rearward position, actuation of the trigger assembly 35 and activation of the main drive 29 will be prevented.

When the safety shield 16 is depressed in a rearward position, the top wall 87 will cover at least a portion of the clip door 18.

As shown in FIG. 8, the barrel 14 of some embodiments is formed as a single integral unit, including the alignment head 28 defined at the distal end 24. Attached to the proximal end 26 of the barrel is a hammer bushing 92 coaxial with the longitudinal axis 22. In some embodiments, the hammer bushing 92 further includes a bushing sleeve 94 which is integrally attached to the barrel 14 and extends along longitudinal axis 22 from proximal end 26, as shown in FIG. 4.

Figure 9:
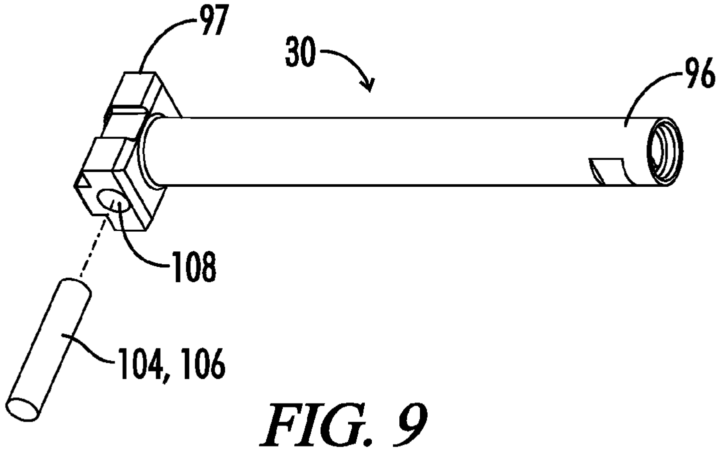
FIG. 9 is a perspective view of a hammer and guide pin according to an embodiment of the present invention.

As illustrated in FIG. 9, the hammer shaft 96 may be joined with a hammer head 97 to substantially form the hammer 30.

Returning to FIGS. 4 and 6, some embodiments include a hammer bushing 92 which receives the hammer shaft 96. The hammer head 97 engages with a clip 42A to transport the clip 42A from the clip receiving cavity 40 and through the alignment head 28. The main drive 29 engages with the shaft 96 to control the reciprocal motion of the hammer 30.

As shown in FIG. 4, the barrel 14 also includes a first and second inner sidewall 98, 100. The second sidewall 100 is configured to be positioned opposite the first sidewall 98. Disposed within the first or second sidewall 98,100, is at least one guide slot 102, including slots 102A and 102B. The at least one guide slot 102 extends approximately parallel to the longitudinal axis 22 and is configured to receive a projection 104 which is connected to the hammer 30.

The interaction between the guide slot 102 and projection 104 stabilizes the movement of the hammer 30 as it reciprocates along a longitudinal path within the barrel 14. The projection 104 forces the hammer 30 to follow the path of the guide slot 102. Even if force is not evenly applied to the hammer head 97 or shaft 96 (e.g., if a clip 42A becomes misaligned or does not break evenly from the string 44), the hammer 30 will not be deflected from its longitudinal path. Advantageously, the relatively low surface area of the projection 104 allows the projection to stabilize the hammer 30 without significantly increasing the frictional resistance against the hammer 30 moves through the barrel 14.

FIG. 9 illustrates an embodiment wherein the projection 104 includes a cylindrical guide pin 106. In such embodiments, a pin hole 108 is defined within the hammer head 97. The guide pin 106 may be separable and have a diameter approximately equal to the diameter of a pin hole 108. Optionally, the guide pin 106 may be selectively inserted or removed from the pin hole 108.

Alternatively, some embodiments may require the guide pin 106 to be permanently joined to the pin hole 108. Still other embodiments may require the guide pin 106 to be integrally formed with the hammer 30.

In some embodiments, the guide slot 102 includes a first guide slot 102A and second guide slot 102B defined within the first inner sidewall 98 and second inner sidewall 100, respectively.

FIGS. 2, 7A, 7B, and 8 show an embodiment wherein the barrel 14 includes an integral support pin 110 disposed on the first side 32 of the barrel. Corresponding to the support pin 110 is a shield channel 114 defined within the safety shield 16. During use, the support pin 110 is disposed within the shield channel 114. Together, the support pin 110 and shield channel 114 serve to guide the safety shield 16 as it moves in a distal or proximal direction.

Formed at the end of the support pin 110 is a flared member 112. The flared member 112 at least partially covers the safety shield 16 and prevents the shield 16 from disengaging or sliding off of the support pin 110 during use.

In some embodiments, the shield channel 114 has a longitudinal length 116 greater than its vertical height 118. Conversely, in those embodiments, the flared member 112 may have a lateral width 118 less than its height 120.

In some embodiments, the height 120 of the flared member 112 should be equal to or lesser than the longitudinal length 116 of the shield channel 114. Similarly, the lateral width 122 of the flared member should be equal to or lesser than the shield channel width 118. During operation of the clip applying apparatus 10, the flared member 112 will prevent the safety shield 16 from shifting in alignment. When removal of the safety shield 16 is desired (e.g., during repair or service of the clip applying apparatus 10), the safety shield 16 may be rotated about the support pin 110 until the longitudinal length 116 of the shield channel 114 is aligned with the flared member height 120. Upon alignment of the shield channel length 116 and flared member height 120, the shield member 16 may be pulled laterally past the support pin 110 and flared member 112.

Optionally, the flared member 112 may be a removable element, selectively fixed to the support pin 110. In such embodiments, the flared member 112 may assume any shape in which the vertical height 118 exceeds the shield channel width.

While the making and using of various embodiments of the present invention are discussed in detail, it should be appreciated that the present invention provides many applicable inventive concepts that is embodied in a wide variety of specific contexts. The specific embodiments discussed herein are merely illustrative of specific ways to make and use the invention and do not delimit the scope of the invention. It is understood that numerous changes in the arrangement and construction of parts and steps may be made by one of ordinary skill in the art without departing from the spirit and scope of the present invention as claimed herein.

What is claimed is:

1. An apparatus for applying a clip to a first reinforcing bar and a second reinforcing bar, the apparatus comprising:

a barrel including:

a longitudinal axis, a distal end, a clip receiving cavity, and an alignment head defined at the distal end;

a hammer received in the barrel;

a main drive connected to the hammer, the main drive configured to reciprocate the hammer within the barrel;

a clip track connected to the barrel, the clip track aligned with the cavity for guiding a string of frangibly connected clips into the cavity;

a safety shield, connected to the barrel, the safety shield including a forward portion extending distally beyond the alignment head; and a lockout lever pivotally connected to the barrel, the lockout lever including:

a lever body, a lobe member extending laterally from the lever body towards the clip receiving cavity, and a stop member defined on the lever body to block proximal motion of the safety shield when the lever body is pivoted outward from the barrel.

2. The apparatus of claim 1, further comprising a pivot spring connected to the lockout lever to bias the lockout lever toward the clip receiving cavity.

3. The apparatus of claim 1, wherein the lockout lever is pivotal between a first position preventing proximal movement of the safety shield and a second position permitting proximal movement of the safety shield.

4. The apparatus of claim 3, wherein:

the barrel further includes:

a first side, and a second side disposed opposite the first side;

the lockout lever is pivotally connected to the first side; and the lobe member further includes:

an inner face directed towards the second side, the inner face configured to engage the string of frangibly connected clips and thereby force the pivot lever outward away from the barrel when the lockout lever is in the first position, and a support face directed towards the clip receiving cavity, the support face configured to engage the string of frangibly connected clips and thereby prevent regressive movement of the string of frangibly connected clips when the lockout lever is in the second position.

5. The apparatus of claim 4, wherein:

the safety shield includes an edge wall facing proximally; and the stop member engages the edge wall when the lockout lever is in the first position and proximal movement by the safety shield is simultaneously attempted.

6. The apparatus of claim 1, wherein:

the barrel includes:

a first side, and a second side disposed opposite the first side;

the apparatus includes:

an anti-backup lever pivotally connected to the second side, the anti-backup lever including a tooth extending towards the clip track for engaging the string of frangibly connected clips and thereby prevent regressive movement of the string of frangibly connected clips; and the lockout lever is pivotally connected to the first side.

7. The apparatus of claim 6, wherein:

the lockout lever is positioned to engage a first clip of the string of frangibly connected clips when the first clip is received within the clip receiving cavity; and the anti-backup lever tooth is positioned to engage a second clip of the string of frangibly connected clips when the lockout lever is engaged with the first clip, the second clip being adjacent to the first clip.

8. The apparatus of claim 6, wherein the anti-backup lever includes a retention spring for biasing the anti-backup lever toward the clip track.

9. The apparatus of claim 1, wherein:

the lockout lever includes a pivot joint defined within the lever body; and the safety shield further includes a wall configured to substantially cover the pivot joint.

10. An apparatus for applying a clip to a first reinforcing bar and a second reinforcing bar, the apparatus comprising:

a barrel including:

a distal end, a receiving side, an exit side opposite the receiving side, a clip receiving cavity positioned between the receiving side and exit side, and an alignment head defined at the distal end;

a hammer received in the barrel;

a main drive connected to the hammer, the main drive configured to reciprocate the hammer within the barrel;

a clip door connected to the barrel exit side and aligned with the clip receiving cavity, the clip door being movable between an open position and a closed position, the clip door including:

a door body, and a grip member extending laterally from the door body;

a sliding-pivot channel defined in one of the barrel and the clip door, the sliding-pivot channel including a channel length and a channel width, wherein the channel width is smaller than the channel length;

a pivot pin attached to the other of the barrel and the clip door and received in the sliding-pivot channel; and a door stop tab fixed to the barrel exit side, the door stop tab configured to engage the grip member when the clip door is in the closed position.

11. The apparatus of claim 10, further comprising:

a biasing spring attached to the barrel and the clip door, the biasing spring configured to bias the clip door along the length of the sliding-pivot channel toward the door stop tab when the clip door is in the closed position.

12. The apparatus of claim 11, wherein the biasing spring includes a distal spring end attached to the barrel exit side and a proximal spring end attached to the clip door.

13. The apparatus of claim 11, wherein:

the clip door includes a recess; and the biasing spring is received within the recess to ensure the biasing spring does not enter the clip receiving cavity.

14. The apparatus of claim 10, wherein the door stop tab includes a hook integrally attached to the barrel.

15. The apparatus of claim 14, wherein the hook includes a concave inner face directed toward the barrel exit side, the concave inner face configured to engage the clip door grip member when the clip door is in the closed position.

16. An apparatus for applying a clip to a first reinforcing bar and a second reinforcing bar, the apparatus comprising:

a barrel including:

a longitudinal axis, an integrally-joined distal end and proximal end, a clip receiving cavity, and an alignment head defined at the distal end;

at least one guide slot disposed within the barrel, the guide slot approximately parallel to the longitudinal axis;

a hammer received in the barrel, the hammer including a shaft;

a projection attached to the hammer and received within the at least one guide slot;

a hammer bushing coaxial with the longitudinal axis of the barrel and attached to the barrel at the proximal end, the shaft being received in the bushing to support the hammer; and a main drive connected to the hammer, the main drive configured to reciprocate the hammer within the barrel.

17. The apparatus of claim 16, wherein the projection includes a separable guide pin connected to the hammer.

18. The apparatus of claim 17, wherein the hammer includes a hammer head including a pin hole defined within the hammer head, wherein the guide pin is received within the pin hole.

19. The apparatus of claim 16, wherein:

the barrel includes:

a first inner sidewall; and a second inner sidewall positioned opposite the first inner sidewall; and the at least one guide slot includes:

a first guide slot defined within the first inner sidewall, and a second guide slot defined within the second inner sidewall.

20. The apparatus of claim 16, wherein the hammer bushing includes a bushing sleeve integrally attached to the barrel, the bushing sleeve extending along the longitudinal axis from the proximal end of the barrel.

* * * * *